United States Patent
Odaka et al.

(10) Patent No.: US 12,464,980 B2
(45) Date of Patent: Nov. 11, 2025

(54) COMPACTION ROLLER FOR WORKING MACHINE

(71) Applicant: HONDA MOTOR CO., LTD., Tokyo (JP)

(72) Inventors: Takuya Odaka, Wako (JP); Kenta Sugitate, Wako (JP); Tatsuya Ide, Wako (JP); Kohei Hada, Wako (JP); Yoshiya Nakagawa, Wako (JP); Toshiaki Takamura, Tokyo (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 829 days.

(21) Appl. No.: 17/704,834

(22) Filed: Mar. 25, 2022

(65) Prior Publication Data

US 2023/0301236 A1    Sep. 28, 2023

(51) Int. Cl.
*A01D 34/68* (2006.01)
*A01D 34/78* (2006.01)
*A01D 43/00* (2006.01)
*A01D 101/00* (2006.01)

(52) U.S. Cl.
CPC ........... *A01D 43/006* (2013.01); *A01D 34/68* (2013.01); *A01D 34/78* (2013.01); *A01D 2101/00* (2013.01)

(58) Field of Classification Search
CPC .............. A01D 43/006; A01D 2101/00; A01D 34/001; A01D 34/64; A01D 2102/00
USPC ............................. 56/16.7, 13.7, 249, 249.5
See application file for complete search history.

(56) References Cited

U.S. PATENT DOCUMENTS

| | | | | |
|---|---|---|---|---|
| 992,499 A * | 5/1911 | Guy | ...................... | A01D 43/006 56/249 |
| 2,532,105 A * | 11/1950 | King | ................... | A01D 34/475 180/19.1 |
| 2,674,837 A * | 4/1954 | Buck | ..................... | A01D 34/475 56/15.8 |
| 2,912,813 A * | 11/1959 | Ellsworth | .............. | A01B 45/02 D15/17 |
| 4,514,967 A * | 5/1985 | Scanland | ............... | A01D 34/64 56/14.7 |
| 11,302,989 B2 * | 4/2022 | Sueyoshi | .......... | H01M 10/6563 |
| 11,564,351 B2 * | 1/2023 | Weber | .................. | A01D 43/006 |
| 2009/0255228 A1 | 10/2009 | Sprinkmann | | |
| 2012/0227369 A1* | 9/2012 | Koike | ..................... | B60L 1/003 318/474 |

FOREIGN PATENT DOCUMENTS

| | | | | |
|---|---|---|---|---|
| EP | 0478020 A2 * | 4/1992 | ............. | A01D 34/74 |
| JP | 62-187530 | 11/1987 | | |
| JP | 03-114902 | 11/1991 | | |
| JP | 2013000026 A * | 1/2013 | | |
| WO | WO-9921406 A1 * | 5/1999 | ............... | B60G 3/01 |
| WO | WO-2022176107 A1 * | 8/2022 | ............... | B60K 1/04 |

* cited by examiner

*Primary Examiner* — Joseph M Rocca
*Assistant Examiner* — Sunny D Webb
(74) *Attorney, Agent, or Firm* — Rankin, Hill & Clark LLP

(57) ABSTRACT

A working machine includes a machine body, a front wheel and a rear wheel provided apart from each other in a front-rear direction of the machine body. A working portion is provided between the front wheel and the rear wheel and includes a power source and a cutter blade capable of being rotated around a rotary shaft by the power source. A compaction roller is provided between the front wheel and the rear wheel.

8 Claims, 6 Drawing Sheets

COMPACTION ROLLER FOR WORKING MACHINE

TECHNICAL FIELD

The present disclosure relates to a working machine including a compaction roller.

BACKGROUND ART

In some cases, a compaction roller (or also referred to as land roller) for hardening the ground after lawn or grass is mowed is attached to a working machine such as a lawn mower or a grass cutter.

For example, a compaction roller disclosed in JP-UM-A-S62-187530 and US-A-2009/255228 is detachably attached to a rear side of a rear wheel of a working machine. The compaction roller is attached to the working machine when, for example, the ground is hardened after lawn or grass is mowed, and is detached from the working machine when the ground is not to be hardened or when the working machine travels on a road.

In addition, in a compaction roller disclosed in JP-UM-A-H03-114902, a weight is applied from above to increase a load applied to the ground in order to suitably press and harden the ground.

In order to suitably press and harden the ground in a compaction operation, it is preferable to apply a sufficient load to the ground from the compaction roller. As disclosed in JP-UM-A-S62-187530 and US-A-2009/255228, when the compaction roller is attached to the rear side of the rear wheel of the working machine, gravity applied to the compaction roller becomes a load applied to the ground. However, the load may not be sufficient depending on a weight and size of the compaction roller.

In addition, in order to increase the load applied to the ground, it is conceivable to apply the weight to the compaction roller as described in JP-UM-A-H03-114902. However, since a glass back for accommodating grass clippings is disposed in a rear portion of the working machine, when the compaction roller is attached to the rear side of the rear wheel of the working machine, it may be difficult to apply a weight to the compaction roller due to a layout.

SUMMARY OF INVENTION

The present disclosure provides a working machine capable of utilizing gravity applied to a machine body for a compaction operation.

The working machine according to the present disclosure includes:
a machine body;
a front wheel and a rear wheel provided apart from each other in a front-rear direction of the machine body;
a working portion provided between the front wheel and the rear wheel, and including a power source and a cutter blade capable of being rotated around a rotary shaft by the power source; and
a compaction roller provided between the front wheel and the rear wheel.

According to the present disclosure, gravity applied to the machine body can be utilized for a compaction operation.

DESCRIPTION OF EMBODIMENTS

Figure 1:
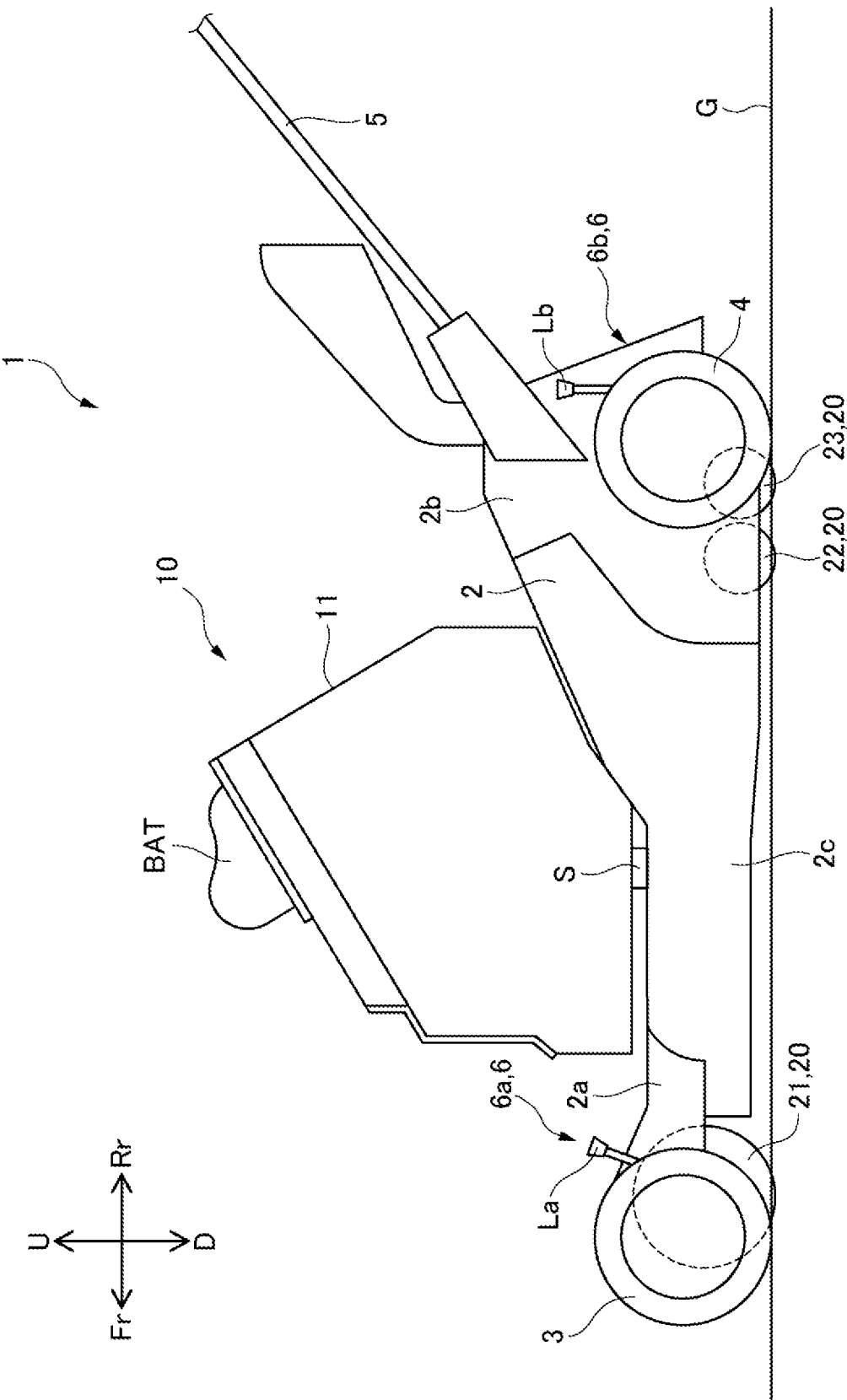
FIG. 1 is a side view of a working machine 1 (compaction mode) according to an embodiment of the present disclosure.

Hereinafter, an embodiment of a working machine of the present disclosure will be described with reference to the accompanying drawings. In addition, each direction of front, rear, left, right, up and down follows a direction seen from an operator, and in the drawings, the front, rear, left, right, up, and down directions of the working machine are indicated by Fr, Rr, L, R, U, and D, respectively. In addition, the drawings are viewed in the direction of the reference numerals.

[Working Machine]

A working machine 1 according to the present embodiment will be described with reference to FIGS. 1 to 4. In the present embodiment, a case where the working machine 1 is an electric lawn mower will be described as an example, but the working machine 1 is not limited thereto and may be a grass mower.

The working machine 1 includes a body portion 2 as a machine body, front wheels 3 disposed at a front portion 2a of the body portion 2, rear wheels 4 disposed at a rear portion 2b of the body portion 2, an operation handle 5 extending upward and rearward from the rear portion 2b of the body portion 2, a working portion 10 provided at a center portion 2c of the body portion 2, and compaction rollers 20 provided between the front wheels 3 and the rear wheels 4.

The front wheels 3 includes a right front wheel 3R and a left front wheel 3L, which are connected to each other by a shaft 3S. The rear wheels 4 includes a right rear wheel 4R and a left rear wheel 4L, which are connected to each other by a shaft 4S. The center portion 2c of the body portion 2 is opened downward, and is provided with a blade accommodating portion 2c1 in which a cutter blade 12 to be described later is accommodated.

The working machine 1 is a walking type working machine, and moves when an operator operates the operation handle 5. The working machine 1 is not limited to the walking type working machine, and may be, for example, a working machine which moves by an operator riding on the working machine 1, a working machine which moves by an operator performing remote control, or a working machine which moves by autonomous control.

The working portion 10 includes a power unit 11 mounted above the center portion 2c of the body portion 2, and the cutter blade 12 provided in the blade accommodating portion 2c1 to cut grass.

The power unit 11 is one package in which electric devices such as a battery BAT, a motor MOT, and a control device CTR for controlling these components are accommodated in a cover 11a. The power unit 11 is configured such that the battery BAT is detachable.

A rotary shaft S of the motor MOT extends in an up-down direction from the power unit 11 to the blade accommodating portion 2c1, and the cutter blade 12 is attached to the rotary shaft S. The motor MOT is driven by electric power from the battery BAT, and the cutter blade 12 rotates around the rotary shaft S by power of the motor MOT to cut grass. The rotary shaft S of the motor MOT is also referred to as the rotary shaft S of the cutter blade 12.

Figure 4:
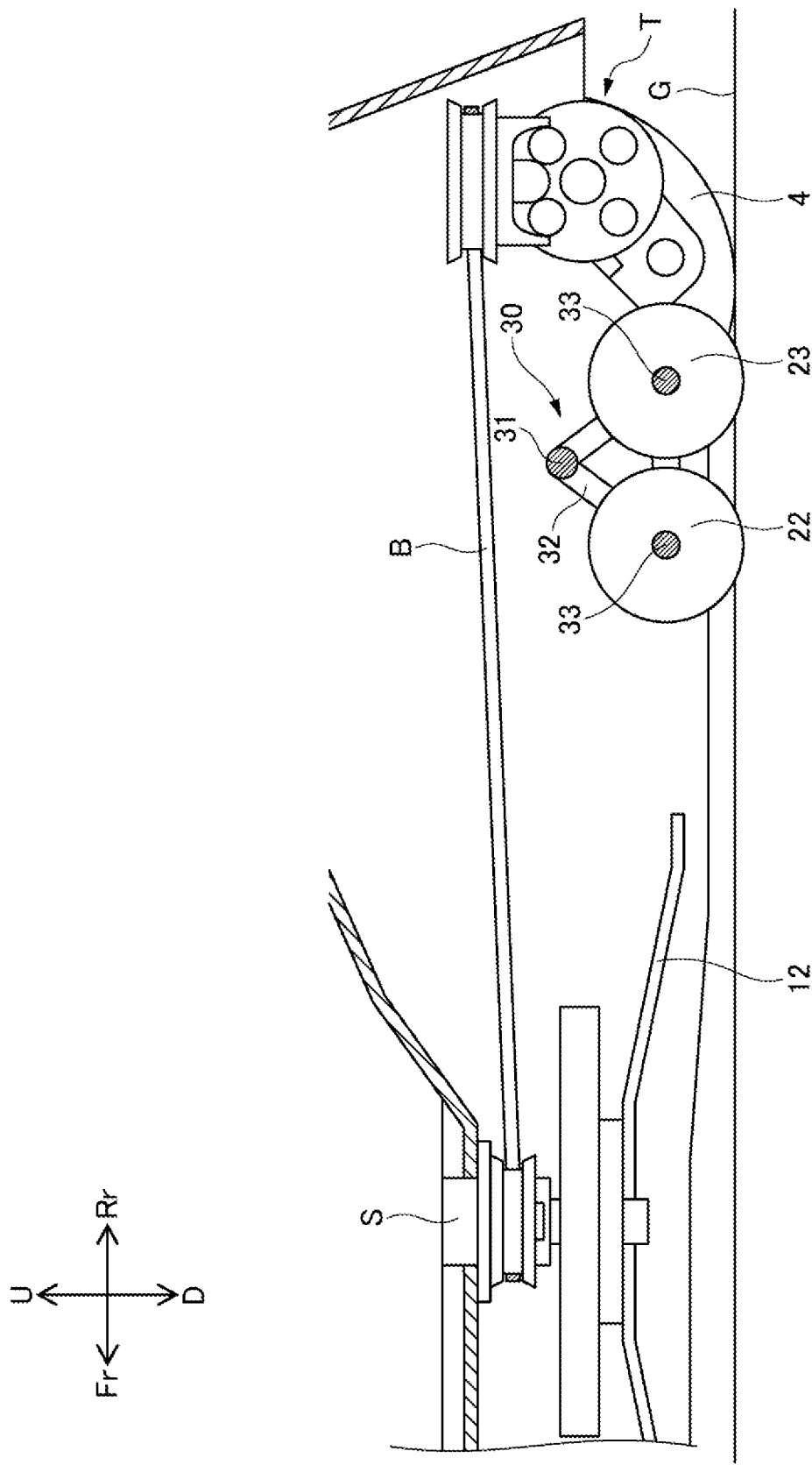
FIG. 4 is a cross-sectional view taken along a line B-B in FIG. 2.

As illustrated in FIG. 4, the power of the motor MOT is transmitted to the rear wheels 4 by a power transmission belt B. The power transmission belt B extends from the rotary shaft S of the motor MOT to transmission T provided on the rear portion 2b of the body portion 2. The power of the motor MOT transmitted by the power transmission belt Bis transmitted to the right rear wheel 4R and the left rear wheel 4L connected by the shaft 4S via the transmission T. As a result, the rear wheels 4 of the working machine 1 are rotated by the power of the motor MOT, and the working machine 1 travels. It should be noted that the working machine 1 may be additionally provided with a traveling motor, or may be configured to drive the rear wheels 4 by the traveling motor to which electric power is supplied from the battery BAT.

In this manner, the power unit 11 functions as a power source for rotation of the cutter blade 12 and traveling of the working machine 1.

Figure 3:
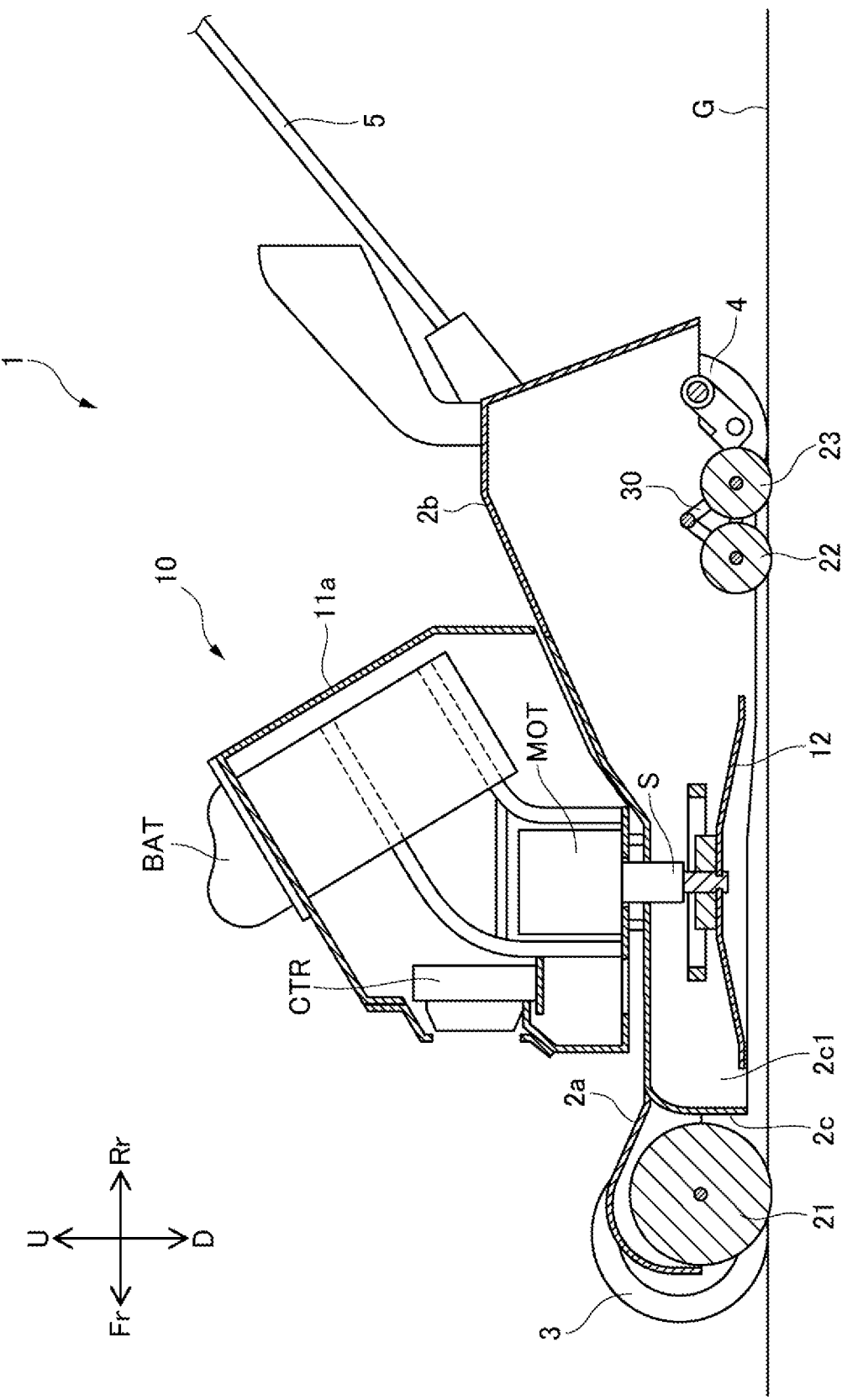
FIG. 3 is a cross-sectional view taken along a line A-A in FIG. 2.

As illustrated in FIGS. 1 and 3, a distance between the front wheels 3 and the rotary shaft S of the cutter blade 12 is substantially the same as a distance between the rear wheels 4 and the rotary shaft S in a front-rear direction. Accordingly, even when the front wheels 3 and the rear wheels 4 move in the up-down direction due to unevenness of the ground G, movement of the cutter blade 12 in the up-down direction is reduced. Therefore, grass can be cut at a uniform height.

The compaction rollers 20 are provided below the body portion 2 and extend in a left-right direction (also referred to as a roller axial direction). The compaction rollers 20 are in contact with the ground G during a compaction operation, and apply loads to the ground G to harden the ground G after grass is cut. The compaction rollers 20 include a front roller 21 provided between the front wheels 3 and the working portion 10, and two rear rollers 22, 23 provided between the rear wheels 4 and the working portion 10. Details of the compaction rollers 20 will be described later.

Figure 5:
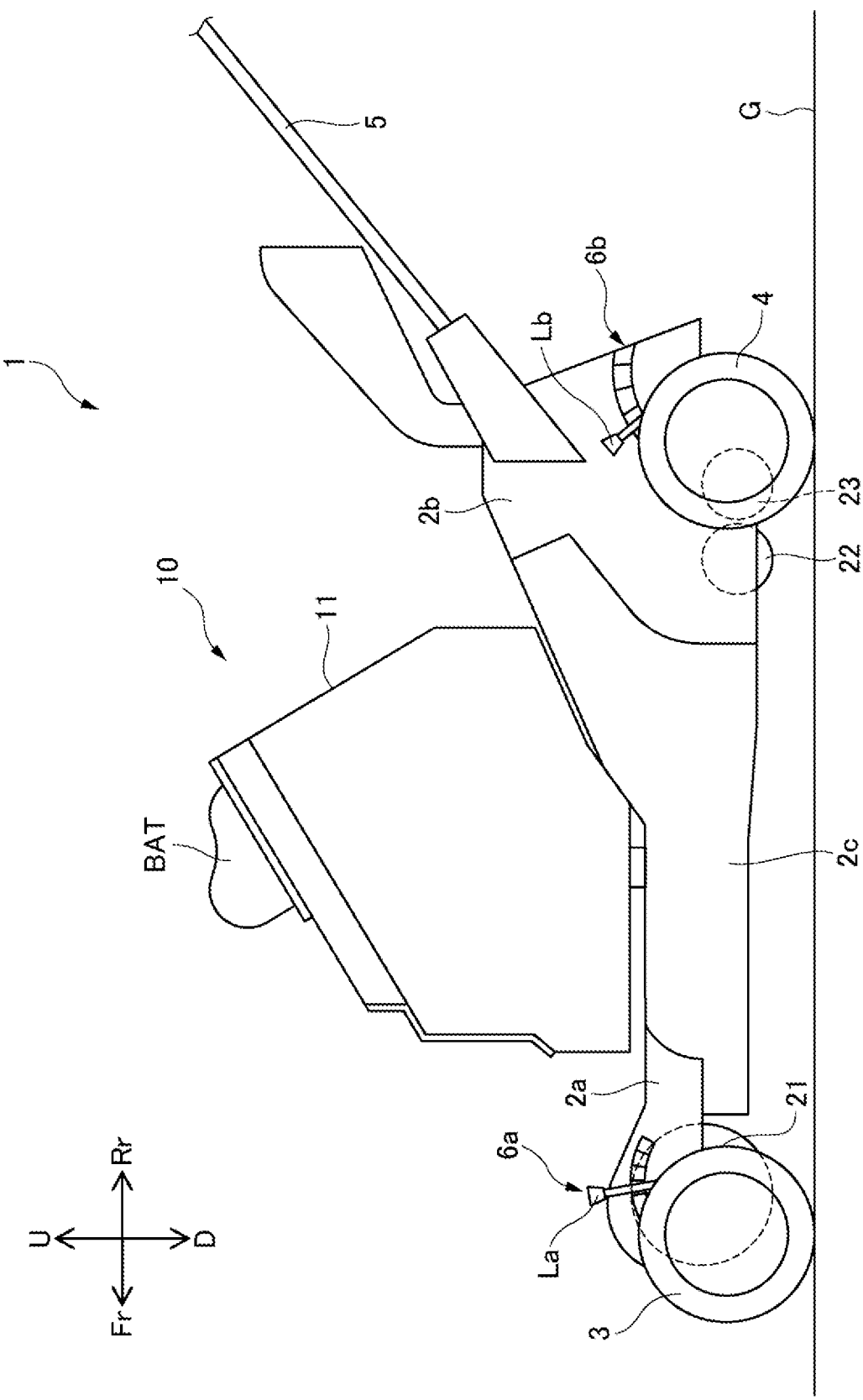
FIG. 5 is a side view of the working machine 1 (non-compaction mode) according to the embodiment of the present disclosure.

The working machine 1 is configured to be capable of being switched between a compaction mode (FIG. 1) in which the compaction operation is performed and a non-compaction mode (FIG. 5) in which the compaction operation is not performed. Specifically, the working machine 1 is configured such that a distance between the body portion 2 and the ground G is variable. In the compaction mode, the distance between the body portion 2 and the ground G is reduced to bring the compaction rollers 20 and the ground G into contact with each other. In the non-compaction mode, the distance between the body portion 2 and the ground G is increased so that the compaction rollers 20 and the ground G are not brought into contact with each other.

The compaction mode includes a case where only the compaction operation is performed and a case where both the compaction operation and a grass mowing operation are performed. In the case where both the compaction operation and the grass mowing operation are performed, grass can be cut relatively short. In the non-compaction mode, only the grass mowing operation is performed. In this case, grass can be cut relatively long.

The working machine 1 includes a height adjustment mechanism 6, as a configuration for switching between the compaction mode and the non-compaction mode, which moves the front wheels 3 and the rear wheels 4 relative to the body portion 2 in the up-down direction. The height adjustment mechanism 6 includes a height adjustment mechanism 6a provided in the front portion 2a of the body portion 2 and a height adjustment mechanism 6b provided in the rear portion 2b of the body portion 2. The height adjustment mechanism 6a includes a lever La, and a link mechanism (not illustrated) which connects the lever La and the left front wheel 3L or the shaft 3S, and can adjust a height of the front wheels 3 in the up-down direction relative to the body portion 2 by an operator rotating the lever La. Similarly, the height adjustment mechanism 6b includes a lever Lb, and a link mechanism (not illustrated) which connects the lever Lb and the left rear wheel 4L or the shaft 4S, and can adjust a height of the rear wheels 4 in the up-down direction relative to the body portion 2 by an operator rotating the lever Lb.

[Compaction Roller]

Next, the details of the compaction rollers 20 (the front roller 21 and the rear rollers 22,23) will be described.

Figure 2:
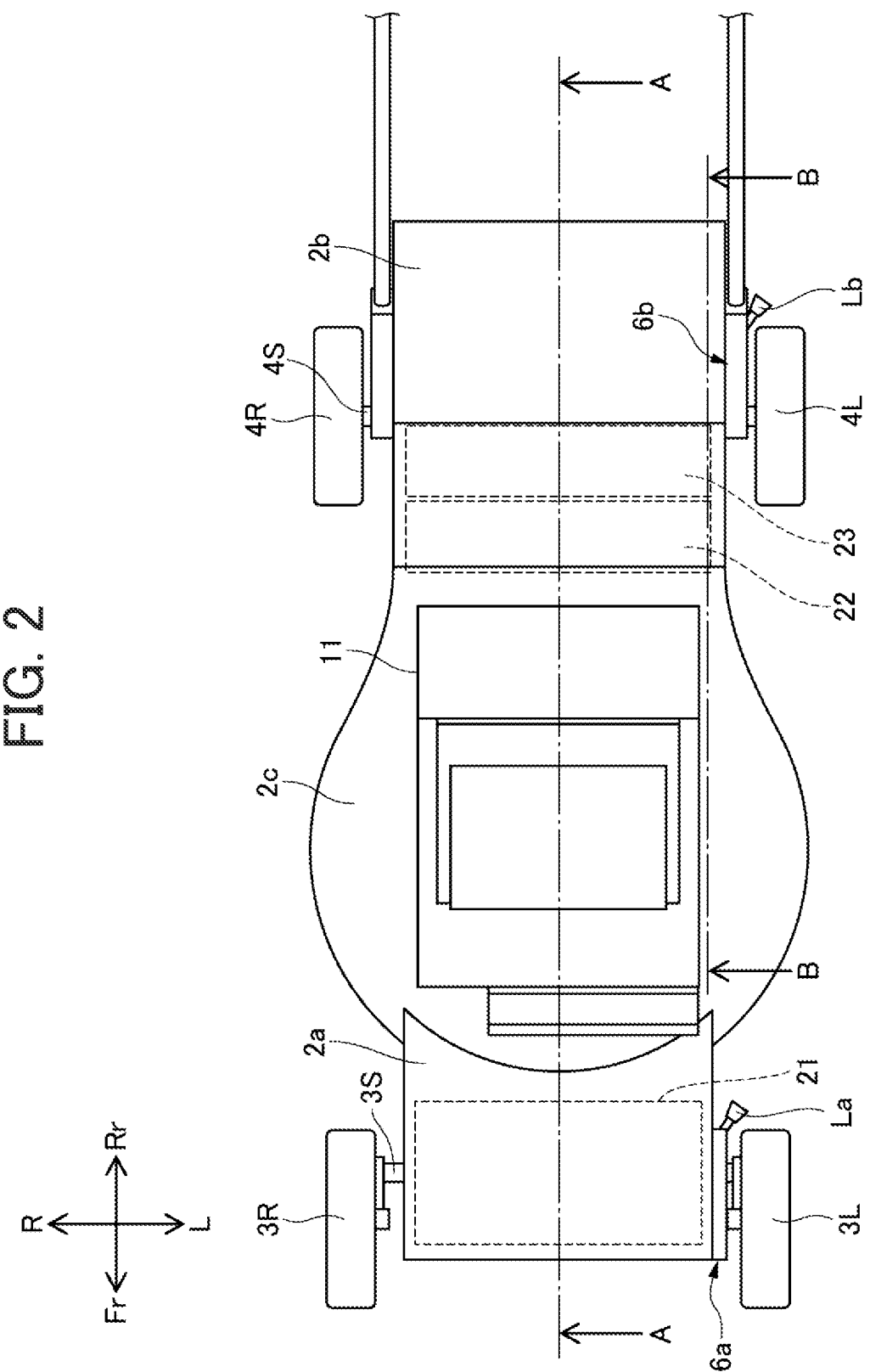
FIG. 2 is a top view of the working machine 1 according to the embodiment of the present disclosure.

The front roller 21 is positioned in front of the blade accommodating portion 2c1, and is rotatably provided in the front portion 2a of the body portion 2. As illustrated in FIG. 2, a length of the front roller 21 in the left-right direction is shorter than a distance between the right front wheel 3R and the left front wheel 3L, and the front roller 21 is disposed between the right front wheel 3R and the left front wheel 3L. A rotation center of the front roller 21 is positioned behind a rotation center of the front wheels 3.

In the compaction mode, a lower end position of the front roller 21 is positioned slightly below a lower end position of the front wheels 3. As a result, since the front roller 21 further sinks into the ground G with respect to the front wheels 3, a sufficient contact area with the ground G can be secured, and the compaction operation can be suitably performed. The front roller 21 is disposed in the vicinity of the front wheel 3, and can compact the ground G using a load substantially equal to a load applied to the front wheels 3.

The two rear rollers 22, 23 are disposed side by side in the front-rear direction. The rear rollers 22, 23 are positioned behind the blade accommodating portion 2c1, and is rotatably provided in the rear portion 2b of the body portion 2. As illustrated in FIG. 2, a length of the rear rollers 22, 23 in the left-right direction is shorter than a distance between the right rear wheel 4R and the left rear wheel 4L, and the rear rollers 22, 23 are disposed between the right rear wheel 4R and the left rear wheel 4L. A rotation center of each of the rear rollers 22, 23 is positioned in front of a rotation center of the rear wheels 4.

In the compaction mode, lower end positions of the rear rollers 22, 23 are positioned slightly below a lower end position of the rear wheels 4. As a result, since the rear rollers 22, 23 further sink into the ground G with respect to the rear wheels 4, a sufficient contact area with the ground G can be secured, and the compaction operation can be suitably performed. The rear rollers 22, 23 are disposed in the vicinity of the rear wheels 4, and can compact the ground G using a load substantially equal to a load applied to the rear wheels 4.

As described above, the compaction rollers 20 are provided between the front wheels 3 and the rear wheels 4, and are disposed at positions close to center of gravity of the working machine 1 (in the vicinity of the working portion 10). Therefore, gravity applied to a machine body can be utilized for the compaction operation. In particular, since the power unit 11 of the working portion 10 includes the heavy electric devices such as the battery BAT and the motor MOT, a compaction effect is improved.

Since the compaction rollers 20 are provided between the front wheels 3 and the rear wheels 4, a wheelbase of the working machine 1 (distance between the rotation center of the front wheels 3 and the rotation center of the rear wheels 4) is longer than a wheelbase of a working machine in which the compaction rollers are not provided between the front wheels 3 and the rear wheels 4. That is, distances between the rotary shaft S of the cutter blade 12 and the wheels (the right front wheel 3R, the left front wheel 3L, the right rear wheel 4R, and the left rear wheel 4L) become longer. Accordingly, even when all the wheels move in the up-down direction due to the unevenness of the ground G, an influence on the cutter blade 12 is small, and the movement of the cutter blade 12 in the up-down direction is small. Therefore, grass can be cut at a uniform height.

The compaction rollers 20 are provided integrally with the working machine 1. In a case where the compaction rollers are provided separately from the working machine, a place for storing the single compaction roller is required, or maintenance or management of the single compaction roller is required, but such a problem does not occur in the working machine 1.

Since the front roller 21 and the rear rollers 22, 23 are provided so as to sandwich the working portion 10, the gravity applied to the working machine 1 is uniformly applied to the ground G in the front-rear direction via the front roller 21 and the rear rollers 22, 23. In addition, since weights of the compaction rollers 20 are dispersed in the front-rear direction, a position of the center of gravity of the working machine 1 is not biased to one side in the front-rear direction. Therefore, the working machine 1 can be uniformly pressed against the ground G. In addition, since the front roller 21 and the rear rollers 22, 23 are provided below the body portion 2, the position of the center of gravity of the working machine 1 can be lowered.

As described above, since the power transmission belt B extends from the rotary shaft S of the motor MOT to the transmission T provided on the rear portion 2b of the body portion 2, a space for the power transmission belt B is required above the rear rollers 22, 23. Therefore, diameters of the rear rollers 22, 23 are designed to be smaller than a diameter of the rear wheels 4. More specifically, the diameters of the rear rollers 22, 23 are designed to be smaller than a distance between the ground G and the power transmission belt B. Although the rear rollers 22, 23 are smaller than the front roller 21, since the two rear rollers 22, 23 are provided, the sufficient contact area with the ground G can be secured. Even when the ground G is distorted, at least one of the rear rollers comes into contact with the ground G, so that the compaction operation can be performed more uniformly.

Figure 6:
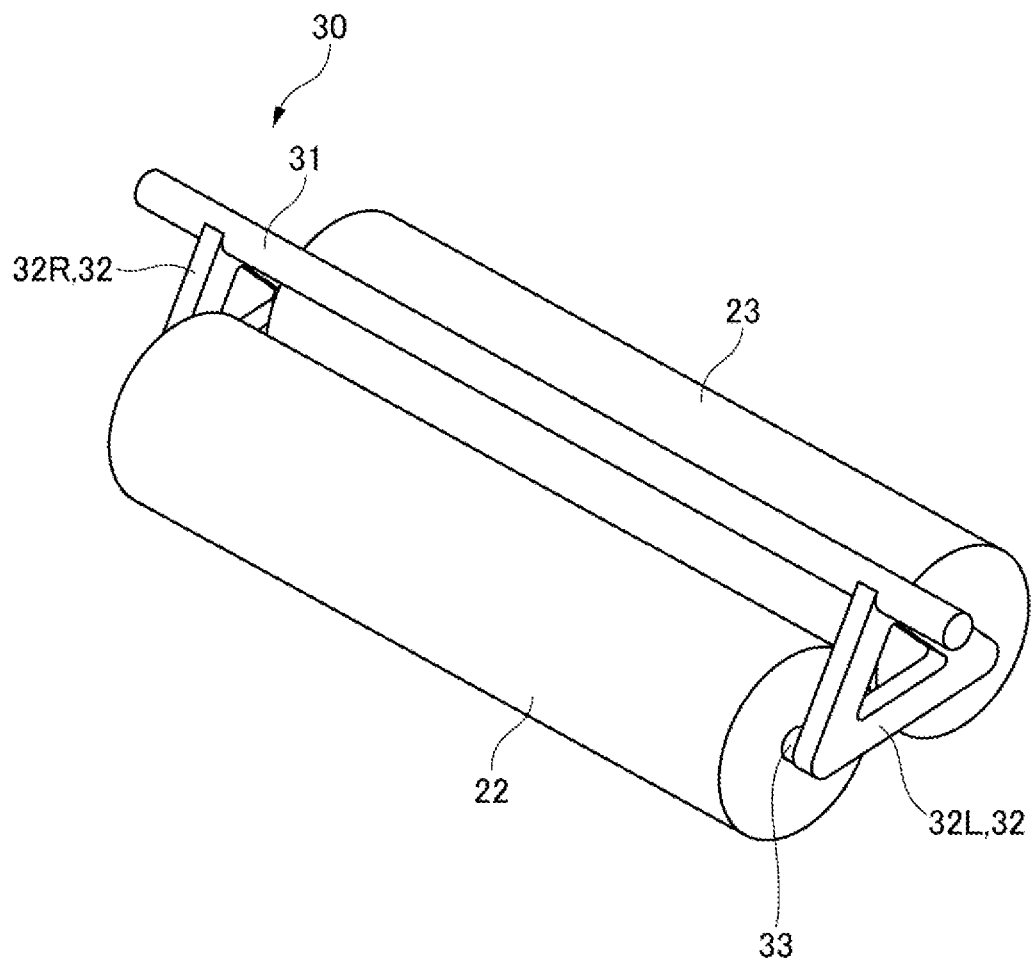
FIG. 6 is a perspective view illustrating rear rollers 22, 23 and a support portion 30 which supports the rear rollers 22, 23.

The two rear rollers 22, 23 are integrally fixed to the body portion 2 by a support portion 30. As illustrated in FIG. 6, the support portion 30 includes a support column 31 extending in the left-right direction and rotatably fixed to the body portion 2, and connection portions 32 provided at end portions of the support column 31 and supporting the rear rollers 22, 23. The connection portions 32 includes a right connection portion 32R provided at a right end portion of the support column 31 and disposed on a right side of the rear rollers 22, 23, and a left connection portion 32L provided at a left end portion of the support column 31 and disposed on a left side of the rear rollers 22, 23.

Each of the right connection portion 32R and the left connection portion 32L has a triangular shape. One vertex of the triangular shape is fixed to the support column 31, and support columns 33 which support the rear rollers 22, 23 are provided at the other two vertices, respectively. The rear rollers 22, 23 are rotatably supported by the corresponding support columns 33, respectively.

The two rear rollers 22, 23 integrally supported by the support portion 30 are provided on the body portion 2 so as to be capable of swinging around the support column 31. As a result, the rear rollers 22, 23 can follow the unevenness of the ground G, and the compaction operation can be performed uniformly.

In addition, since the two rear rollers 22, 23 are integrally supported by the support portion 30 and provided on the body portion 2, it is possible to provide one mechanism for attaching the two rear rollers 22, 23 to the body portion 2.

Although one embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the respective constituent elements in the above embodiment may be freely combined without departing from the gist of the invention.

For example, although the compaction rollers 20 includes the front roller 21 and the rear rollers 22, 23 in the above embodiment, the compaction rollers 20 may include only one of the front roller 21 and the rear rollers 22, 23. In the above embodiment, the compaction rollers 20 include the two rear rollers 22, 23, but may include one rear roller or three or more rear rollers. That is, when the compaction rollers 20 include the rear roller, the compaction rollers 20 may include at least one rear roller.

In the above embodiment, the battery BAT and the motor MOT are used as the power source, but an engine may be used as the power source.

In the above embodiment, the height adjustment mechanism 6 moves the front wheels 3 and the rear wheels 4 relative to the body portion 2 in the up-down direction, but the height adjustment mechanism 6 may move the compaction rollers 20 relative to the body portion 2 in the up-down direction. In this case, the link mechanism included in the height adjustment mechanism 6 is coupled to the compaction rollers 20. Further, in the above embodiment, the height adjustment mechanism 6 is a mechanical type of mechanism in which the operator rotates the lever L. However, the height adjustment mechanism 6 may be an electric type of mechanism in which the compaction rollers 20 or the front wheels 3 and the rear wheels 4 are moved by the electric power from the battery BAT.

In the above embodiment, the working portion 10 includes four wheels, but the working portion 10 is not limited thereto, and may include, for example, three wheels.

In the present specification, at least the following matters are described. In the parentheses, the corresponding components and the like in the above-described embodiment are shown as an example, but the present invention is not limited thereto.

(1) A working machine (working machine 1) includes:
a machine body (body portion 2);
a front wheel (front wheel 3) and a rear wheel (rear wheel 4) provided apart from each other in a front-rear direction of the machine body;
a working portion (working portion 10) provided between the front wheel and the rear wheel, and including a power source (power unit 11) and a cutter blade (cutter blade 12) capable of being rotated around a rotary shaft (rotary shaft S) by the power source; and a compaction roller (compaction roller 20) provided between the front wheel and the rear wheel.

According to (1), the compaction roller is provided between the front wheel and the rear wheel, and thus the compaction roller is disposed at a position close to center of gravity of the working machine. Therefore, the gravity applied to the machine body can be utilized for the compaction operation. In addition, the compaction roller is provided between the front wheel and the rear wheel, and thus a wheelbase of the working machine can be made long. Accordingly, even when all the wheels move in the up-down direction due to unevenness of the ground, an influence on the cutter blade is small, and movement of the cutter blade in the up-down direction is small. Therefore, grass can be cut at a uniform height.

(2) The working machine according to (1) further includes
   a height adjustment mechanism (height adjustment mechanism 6) configured to move the compaction roller or the front wheel and the rear wheel relative to the machine body in an up-down direction.

According to (2), since the working machine includes the height adjustment mechanism configured to move the compaction roller or the front wheel and the rear wheel relative to the machine body in the up-down direction, it is possible to switch between the compaction mode and the non-compaction mode.

(3) The working machine according to (1) further includes
   a height adjustment mechanism (height adjustment mechanism 6) configured to move the front wheel and the rear wheel relative to the machine body in an up-down direction.

According to (3), since the working machine includes the height adjustment mechanism configured to move the front wheel and the rear wheel relative to the machine body in the up-down direction, it is possible to switch between the compaction mode and the non-compaction mode.

(4) In the working machine according to any one of (1) to (3),
   the compaction roller includes at least one of a front roller (front roller 21) provided between the front wheel and the working portion, and at least one rear roller (rear rollers 22, 23) provided between the rear wheel and the working portion.

According to (4), since the compaction roller includes at least one of the front roller and the rear roller, the compaction operation can be performed using a load applied to at least one of the front wheel and the rear wheel.

(5) In the working machine according to (4),
   the compaction roller includes the at least one rear roller, and
   a diameter of the at least one rear roller is smaller than a diameter of the rear wheel.

According to (5), since the diameter of the at least one rear roller is smaller than the diameter of the rear wheel, a power transmission belt for transmitting power of the power source to the rear wheel can be provided above the rear roller.

(6) In the working machine according to (4) or (5),
   the compaction roller includes two rear rollers (rear rollers 22, 23) provided between the rear wheel and the working portion.

According to (6), since the compaction roller includes two rear rollers, a sufficient contact area with the ground can be secured. Even when the ground is distorted, at least one of the two rear rollers comes into contact with the ground, so that the compaction operation can be performed more uniformly.

(7) The working machine according to (6) further includes
   a support portion (support portion 30) which supports the two rear rollers and has a support column (support column 31), in which
   the two rear rollers are provided on the machine body to be capable of swinging around the support column.

According to (7), the two rear rollers are provided on the machine body so as to be capable of swinging around the support column, and thus, the rear rollers can follow the unevenness of the ground, so that the compaction operation can be performed uniformly.

(8) In the working machine according to (4),
   the compaction roller includes the front roller and the at least one rear roller.

According to (8), since the compaction roller includes the front roller and the at least one rear roller, gravity applied to the machine body is uniformly applied to the ground in the front-rear direction via the front roller and the rear roller. In addition, since a weight of the compaction roller is dispersed in the front-rear direction, a position of the center of gravity of the machine body is not biased to one side in the front-rear direction. Therefore, the machine body can be uniformly pressed against the ground.

(9) In the working machine according to any one of (1) to (8),
   in the front-rear direction, a distance between the front wheel and the rotary shaft is substantially the same as a distance between the rear wheel and the rotary shaft.

According to (9), since the distance between the front wheel and the rotary shaft is substantially the same as the distance between the rear wheel and the rotary shaft, even when the front wheel and the rear wheel move in the up-down direction due to the unevenness of the ground, movement of the cutter blade in the up-down direction is reduced. Therefore, grass can be cut at a uniform height.

(10) In the working machine according to any one of (1) to (9),
   the working portion includes a battery (battery BAT) and a motor (motor MOT) which causes the cutter blade to rotate by electric power from the battery.

According to (10), since the working portion is an electric device including the battery and the motor, a weight of the heavy electric device can be utilized for the compaction operation, and the compaction effect is improved.

The invention claimed is:
1. A working machine comprising:
a machine body;
a front wheel and a rear wheel provided apart from each other in a front-rear direction of the machine body;
a working portion provided between the front wheel and the rear wheel, and including a battery, a power source driven by electric power from the battery, and a cutter blade capable of being rotated around a rotary shaft by the power source; and
a compaction roller provided between the front wheel and the rear wheel,
wherein the battery and the power source are disposed in a middle position in the front-rear direction of the machine body between the front wheel and the rear wheel, and the battery is tilted forward,
the compaction roller includes a front roller and a rear roller unit, the rear roller unit including at least one rear roller, and
a lower end position of the front roller is positioned below a lower end position of the front wheel, and a lower end position of the at least one rear roller is positioned below a lower end position of the rear wheel.

2. The working machine according to claim 1 further comprising:
a height adjustment mechanism configured to move the compaction roller or the front wheel and the rear wheel relative to the machine body in an up-down direction.

3. The working machine according to claim 1 further comprising:
a height adjustment mechanism configured to move the front wheel and the rear wheel relative to the machine body in an up-down direction.

4. The working machine according to claim 1,
wherein the front roller is provided between the front wheel and the working portion, and the rear roller unit is provided between the rear wheel and the working portion.

5. The working machine according to claim 4, wherein
a diameter of the at least one rear roller of the rear roller unit is smaller than a diameter of the rear wheel.

6. The working machine according to claim 4,
wherein the at least one rear roller of the rear roller unit includes two rear rollers provided between the rear wheel and the working portion.

7. The working machine according to claim 6 further comprising:
a support portion which supports the two rear rollers and has a support column,
wherein the two rear rollers are provided on the machine body to be capable of swinging around the support column.

8. The working machine according to claim 1,
wherein in the front-rear direction, a distance between the front wheel and the rotary shaft is substantially the same as a distance between the rear wheel and the rotary shaft.

* * * * *